(12) United States Patent
Reitz de Swardt et al.

(10) Patent No.: US 11,845,174 B2
(45) Date of Patent: Dec. 19, 2023

(54) ROTATING TOOL BASE WITH MODULAR HEADS

(71) Applicant: APEX BRANDS, INC., Apex, NC (US)

(72) Inventors: Rolf Reitz de Swardt, Blythewood, SC (US); John Fiumefreddo, Irmo, SC (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 18/016,068

(22) PCT Filed: Aug. 2, 2022

(86) PCT No.: PCT/US2022/039108
§ 371 (c)(1),
(2) Date: Jan. 13, 2023

(87) PCT Pub. No.: WO2023/014675
PCT Pub. Date: Feb. 9, 2023

(65) Prior Publication Data
US 2023/0202019 A1 Jun. 29, 2023

Related U.S. Application Data

(60) Provisional application No. 63/228,659, filed on Aug. 3, 2021.

(51) Int. Cl.
*B25F 5/00* (2006.01)
*B25F 3/00* (2006.01)

(52) U.S. Cl.
CPC ............... *B25F 5/001* (2013.01); *B25F 3/00* (2013.01)

(58) Field of Classification Search
CPC ............. B25B 23/141; B25F 5/00; B25F 3/00
See application file for complete search history.

(56) References Cited

U.S. PATENT DOCUMENTS

| 5,346,022 A | 9/1994 | Krivec | |
|---|---|---|---|
| 7,938,046 B2 * | 5/2011 | Nino | ................ B25B 15/02 81/475 |

(Continued)

OTHER PUBLICATIONS https://www.seekonk.com/cat-49-1-36/inline-torque-limiters.htm (Year: 2021).*

(Continued)

*Primary Examiner* — Daniel Jeremy Leeds
(74) *Attorney, Agent, or Firm* — BURR & FORMAN LLP (57) ABSTRACT

A rotating power tool assembly includes a rotating power base and a modular drive head. The rotating power base may be configured to rotate a spindle, and the modular drive head may be configured to be detachably coupled to the rotating power base. The modular drive head may comprise a torque control clutch, a working tip, and a torque value indicia. The torque control clutch may be non-adjustably structured to implement a torque limiting slip event that prevents the working tip from further rotation, despite continued rotation of the spindle, in response to the working tip being subjected to torque in excess of a discrete torque value. The torque value indicia may be externally visible and may comprise a visible characteristic that correlates to the discrete torque value.

19 Claims, 5 Drawing Sheets

(56) References Cited

U.S. PATENT DOCUMENTS

| | | | |
|---|---|---|---|
| 2009/0038449 A1 | 2/2009 | Gauthier | |
| 2009/0129876 A1 | 5/2009 | Trautner et al. | |
| 2013/0286635 A1 | 10/2013 | Dixon et al. | |
| 2015/0165608 A1 | 6/2015 | Ivinson et al. | |
| 2017/0232592 A1* | 8/2017 | Nino .................... | B25B 23/141 |
| | | | 81/475 |
| 2020/0230795 A1* | 7/2020 | Carlson ................... | B25C 1/047 |
| 2020/0305893 A1* | 10/2020 | Nino ....................... | B25F 5/001 |

OTHER PUBLICATIONS

International Search Report and Written Opinion of corresponding International Application No. PCT/US2022/039108 dated Oct. 31, 2022, all enclosed pages cited.
https://web.archive.org/web/20191229023340/http:/www.seekonk.com/cat-49-1-36/inline-torque-limiters.htm (Year: 2019).

* cited by examiner

| Discrete Torque Value | Color |
|---|---|
| 3 N m | Yellow |
| 4 N m | Green |
| 5 N m | Orange |

ROTATING TOOL BASE WITH MODULAR HEADS

CROSS-REFERENCE TO RELATED APPLICATIONS

This application claims priority under 35 U.S.C. § 119(e) to U.S. Provisional Application No. 63/228,659, filed Aug. 3, 2021, which is expressly incorporated by reference herein in its entirety.

TECHNICAL FIELD

Example embodiments generally relate to manufacturing technology, and more particularly relate to tool control and management in manufacturing environments.

BACKGROUND

In many manufacturing and assembly environments, such as automobile, aviation and white goods assembly environments, there is a need to ensure that powered rotating tools (e.g., nutrunners, electric screwdrivers, and the like) are operating with appropriate settings (e.g., torque settings and the like) for the given task that is to be performed by a manufacturing worker using the tool. Tools operating with improper settings can create a number of problems. For example, a single tool with an improper torque setting may overtighten fasteners (e.g., bolts, screws, or the like), which may lead to damage to the product being manufactured. Additionally, such overtightening can lead to threads of the fastener becoming cross-threaded or stripped, which can reduce the securing force that fastener can apply and may lead to early failure of the fastener. Another common fault is undertightening (too low torque) in which case the fastener may become loose and even fall out during use. Depending on the type of product that is being manufactured, such fastener issues can reduce overall product reliability and lifespan. As such, techniques that operate to ensure that tools, for example, on a manufacturing floor are properly set for a given task are highly desired.

Additionally, it is desirable for powered rotating tools used in a manufacturing environment to be low-cost. However, many low-cost powered rotating tools are designed for the consumer market, where flexibly and ease of use are valued. As such, these low cost powered rotating tools allow for easy modification of settings. Use of such tools, while being obtainable at a low cost, can be problematic in a manufacturing environment because settings on the tools can be readily changed. As a result, supervisors and managers may be required to constantly monitor tool settings by performing spot checks of the tools. Such spot checks may require actual handling of the tool or being in close proximity to the tool to be able to ascertain the current settings.

Accordingly, improvements in the area of rotating tool setting management are desired, particular to support operations in manufacturing environments.

BRIEF SUMMARY OF SOME EXAMPLES

According to some example embodiments, a rotating power tool assembly is provided that comprises a rotating power base and a plurality of modular drive heads. The rotating power base may be configured to rotate a spindle in response to actuation of a control switch. The modular drive head may be configured to be detachably coupled to the rotating power base and the spindle. The modular drive head may comprise a torque control clutch, a working tip, and a torque value indicia. The torque control clutch may comprise an input drive that is configured to be detachably coupled to the spindle and an output drive operably coupled to the working tip. The input drive may be operably coupled to the output drive to selectably rotate the output drive in response to rotation of the input drive. The torque control clutch may be a non-adjustably structured to implement a torque limiting slip event that prevents the output drive from further rotation, despite continued rotation of the input drive, in response to the output drive being subjected to torque in excess of a discrete torque value. The torque value indicia may be externally visible and the torque value indicia may comprise a visible characteristic that correlates to the discrete torque value.

According to some example embodiments, a rotating power tool accessory system is provided. The system may comprise first modular drive head and a second modular drive head. The first modular drive head may be configured to be detachably coupled to a rotating power base. The first modular drive head may comprise a first torque control clutch and a first torque value indicia. The second modular drive head may be configured to be detachably coupled to the rotating power base. The second modular drive head may comprise a second torque control clutch and a second torque value indicia. The first torque control clutch may be configured to prevent rotation of a first working tip of the first modular drive head in response to the first working tip being subjected to a first discrete torque value. The first torque value indicia may comprise a first visible characteristic that correlates to the first discrete torque value. The second torque control clutch may be configured to prevent rotation of a second working tip of the second modular drive head in response to the second working tip being subjected to a second discrete torque value. The second torque value indicia may comprise a second visible characteristic that correlates to the second discrete torque value. The second discrete torque value may be different from the first discrete toque value and the second visible characteristic m visibly different from the first visible characteristic.

A method for manufacturing compliance is provided. The method may comprise visually verifying that a first rotating power tool assembly operating on a first manufacturing task has a first torque value indicia with a first visual characteristic, and visually verifying that a second rotating power tool assembly operating on a second manufacturing task has a second torque value indicia with a second visual characteristic. The first visual characteristic may indicate that a first rotating power base of the first rotating power tool assembly is attached to a first modular drive head having a first non-adjustable torque control clutch. The first non-adjustable torque control clutch may be configured to limit applied torque to a first discrete torque value correlated to the first visual characteristic and selected for the first manufacturing task. The first modular drive head may be detachably coupled to the first rotating power base. The second visual characteristic may indicate that a second rotating power base of the second rotating power tool assembly is attached to a second modular drive head having a second non-adjustable torque control clutch that limits applied torque to a second discrete torque value correlated to the second visual characteristic and selected for the second manufacturing task. The second modular drive head may be detachably coupled to the second rotating power base. The second discrete torque value may be different from the first discrete torque value and the second visible characteristic may be visibly different from the first visible characteristic.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Various example embodiments described herein address the technical problem of maintaining manufacture procedure compliance by providing tools and accessories that support such compliance. In this regard, according to some example embodiments, a rotating power tool assembly is provided that includes a rotating power base (e.g., motorized portion of an electric screwdriver, nutrunner, or the like) and a plurality of different attachable modular drive heads, where each drive head has a fixed torque control with a different discrete torque value. As such, each modular drive head, according to some example embodiments, offers a single, fixed maximum permitted torque that may be output from the rotating power tool assembly when the modular drive head is coupled to the rotating power base. Since each modular drive head only offers a single torque control option, according to some example embodiments, once attached to the rotating power base, there is no risk of accidentally (or purposely) changing the torque setting on the rotating power tool assembly by a manufacturing worker. As such, manufacturing compliance is maintained or improved.

Additionally, each attachable modular drive head may include a highly visible torque value indicia that includes a visible characteristic that correlates to the torque value (e.g., torque threshold) for the modular drive head. For example, the torque value indicia may be a colored ring (e.g., a yellow ring, red ring, green ring, etc.) that wraps around the modular drive head to indicate the torque value being employed by the modular drive head. The torque value indicia may be formed to be highly visible by, for example, being of a sufficient size to be visible from many feet away (e.g., 10 feet or more). Accordingly, when a modular drive head is attached to a rotating power base, the torque value indicia can be used to quickly and visibly determine which torque value the resultant rotating power tool assembly is operating at. The torque value indicias therefore facilitate the ability to readily inspect and verify the torque values for rotating power tool assemblies in a manufacturing environment to ensure that proper torque value tools are being utilized in association with appropriate tasks. This again supports improved manufacturing compliance and uniformity by allowing, for example, a supervisor to quickly determine that a tool with an incorrect torque value is being utilized on a certain task, based on the visual characteristic of the torque value indicia.

Figure 1:
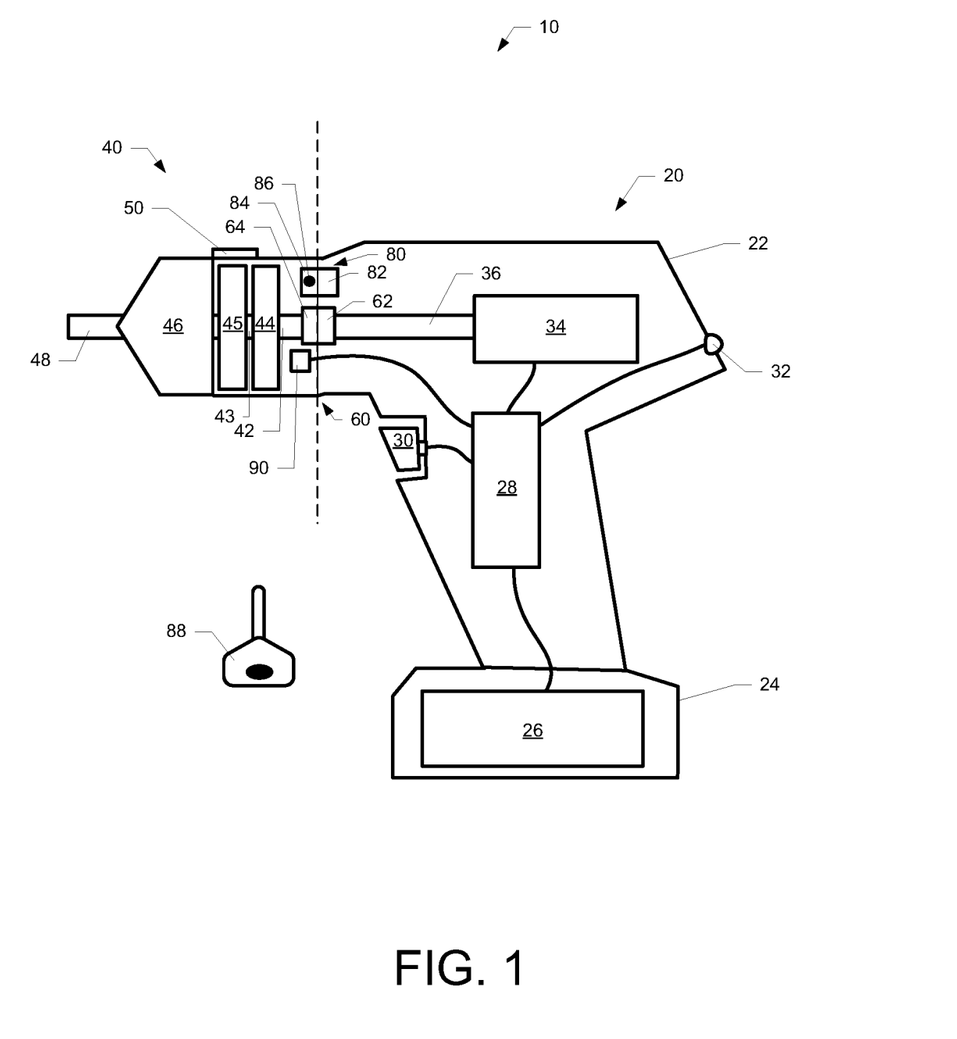
FIG. 1 illustrates a cross-sectional block diagram of an example rotating power tool assembly in accordance with some example embodiments.

In light of the above, FIG. 1 illustrates an example rotating power tool assembly 10 according to some example embodiments. In this regard, the rotating power tool assembly 10 may comprise a rotating power base 20 and a modular drive head 40. The modular drive head 40 may be detachably coupled to the rotating power base 20 at the interface 60. As further described herein, the modular drive head 40 may be removed or detached from the rotating power base 20 and a different modular drive head may be attached to the rotating power base 20 to change a torque value for the rotating power tool assembly 10.

According to some example embodiments, the rotating power base 20 may be the powered and motorized portion of an electric screwdriver, drill, nutrunner, or the like. The rotating power base 20 may comprise a number of components for operation, which may be disposed within a housing 22. Some example components comprise a battery 26, control circuitry 28, a motor 34, and a spindle 36.

The battery 26 may be an example electric power source for the rotating power base 20. The battery 26 allows the rotating power base 20 to be cordless and thus easily used and manipulated without concern for the presence of a tether in the form of an electric cord. However, it is understood that example embodiments may be implemented with a rotating power base 20 that is corded or uses a power source other than or in addition to a battery (e.g., a pneumatic source). The battery 26, as an electrical power source, may provide power to the control circuitry 28, the motor 34, and the output device 32. The battery 26 may be rechargeable as a permanent component of the rotating power base 20 or a removable component that may be removed and replaced with a comparable battery (e.g., that is fully charged).

The control circuitry 28 may comprise a number of electronic components that support the operation of the rotating power base 20 and the rotating power tool assembly 10 as described herein. The control circuitry 28 may comprise one or more integrated circuits that include logic code (hardware or software coded) for controlling the operation of the rotating power base 20. In this regard, the control circuitry 28 may include a processor that may be embodied, for example, as a field programmable gate array (FPGA) or an application specific integrated circuit (ASIC). Alternatively, the processor may be software programmable processing device that executes software or firmware code retrieved from a memory device. The control circuitry 28 may be configured to receive inputs and provide outputs based on the inputs.

In this regard, a control switch 30 may provide a signal to the control circuitry 28 that can be used as an input. For example, when a user depresses the control switch 30

(operating as a trigger), a signal may be provided to the control circuitry 28 as an input, and, in response, the control circuitry 28 may provide an output that permits power to be provided to the motor 34 to cause rotation of the spindle 36. Further, when the control switch 30 is released by the user, the control circuitry 28 may detect the change in the signal provided, and stop power from being provided to the motor 34.

Additionally, the control circuitry 28 may be configured to control an output device 32. According to some example embodiments, the output device 32 may be a light (e.g., light emitting diode (LED)) that may be controlled to provide information to the user about the operation of the rotating power base 20. In this regard, according to some example embodiments, the control circuitry 28 may control the output device 32 to illuminate in different colors based on operating conditions for the rotating power base 20 (e.g., battery power low—needs charge, battery at full charge, an internal error, or the like).

The motor 34 may be an electric motor configured to rotate a spindle 36 to provide a rotational output for the rotating power base 20. Alternatively, the motor 34 may be, for example, a pneumatic motor. The motor 34 may operate at a single rotational speed. However, according to some example embodiments, the motor 34 may be a dual-speed or variable speed motor, and the control circuitry 28 may be configured to receive an input (e.g., from the control switch 30) and control the operation of the motor 34 based on the functionality that the motor 34 offers.

The spindle 36 may be rotated by the motor 34 and the spindle 36 may be the rotational output of the rotating power base 20. According to some example embodiments, the spindle 36 may include a coupler 62. The coupler 62 may be configured to engage with a complimentary coupler 64 (across the interface 60) to form a rotating connection between the rotating power base 20 and the modular drive head 40.

As mentioned above, the modular drive head 40 may be removable from the rotating power base 20 at the interface 60. In this regard, the modular drive head 40 and the rotating power base 20 may include various connection features including the couplers 62 and 64 that operate to secure the modular drive head 40 to the rotating power base 20 until a removal operation is performed. According to some example embodiments, the modular drive head may be removable from the rotating power base 20 without the use of tools (e.g., by hand). In this regard, the modular drive head 40 may include, for example, a securing collar that interfaces and engages with complementary features of the rotating power base 20 to secure (e.g., via a rotational, possibly threaded, engagement) the modular drive head 40 to the rotating power base 20.

The modular drive head 40 may comprise a torque control clutch 44, speed reduction gearing 45, a chuck 46, and a working tip 48. As shown in FIG. 1, a rotating member or shaft extends through modular drive head 40 from the coupler 64 to the working tip 48 and is acted up by, for example, the torque control clutch 44 and the speed reduction gearing 45 to change the rotational operation from the input at the coupler 64 to the output at the working tip 48.

The working tip 48 may directly or indirectly interface with a fastener or a work surface to perform an operation (e.g., a task). The working tip 48 may therefore be a bit, for example, that is secured by the chuck 46, that includes a working end (e.g., a screwdriver tip, a drill bit, a socket bit, or the like) that interfaces directly with a fastener or working surface. Alternatively, the working tip 48 may be a tang or post that a bit or socket is secured to, and the bit or socket directly interfaces with the fastener or working surface.

The speed reduction gearing 45 may be configured to receive an input rotation at a given rotational speed and provide a rotation output that is at a slower speed. Although the speed reduction gearing is shown on the output side of the torque control clutch 44, the speed reduction gearing 45 may alternatively be disposed on the input side of the torque control clutch 44.

The torque control clutch 44 may be a mechanical device that operates to, for example, disengage or "slip" when a torque is applied to an output drive 43 that exceeds a discrete torque value (e.g., a threshold torque). In this manner, the torque control clutch 44 may be configured to provide torque control to the rotating power tool assembly 10.

Controlling the torque applied when performing certain tasks can avoid a number of issues as described above, including damage to the product being manufactured. Without torque control, for example, fasteners could not be tightened to a uniform torque, leading to potential quality control issues. Further, torque control can ensure that fasteners are driven to a desired depth without being under-tightened (e.g., which may result in leaving exposed fastener heads or unsecured heads that permit movement and vibration) or over-tightened (e.g., which may result in the fastener passing completely through the surface attempting to be secured or the fastener becoming cross-threaded or stripped and offering decreased securing forces).

The torque control clutch 44 may comprise an input drive 42 that is configured to be detachably coupled to the spindle 36 (directly or indirectly) and an output drive 43 operably coupled to the working tip 48. The input drive 42 may be operably coupled to the output drive 43, through the torque control clutch 44. The torque control clutch 44 may therefore selectably rotate the output drive 43 in response to rotation of the input drive 42, when the torque being applied to the output drive 43 does not exceed the discrete torque value. In other words, the torque control clutch 44 may be configured to implement a torque limiting slip event that prevents the output drive 43 from further rotation, despite continued rotation of the input drive 42, in response to the output drive 43 being subjected to torque in excess of a discrete torque value. The discrete torque value for the modular drive head 40 may be determined by the mechanical configuration of the torque control clutch 44, which, according to some example embodiments, may be fixed. The discrete torque value may be selected to be a specific torque value in, for example, Newton meters, rather than a relative torque setting amongst a number of options as provided on some adjustable torque control tools. According to some example embodiments, the torque control clutch 44 may be non-adjustably structured and therefore the discrete torque value may be set at manufacturing of the modular drive head and may not be later changed. As mentioned above, the inability to change the discrete torque value for a modular drive head 40 prevents torque setting changes that can lead to manufacturing compliance issues.

Alternatively, according to some example embodiments, the discrete torque value of the modular drive head 40 may be adjusted after manufacturing. In such embodiments, for example, adjustment may be made only with tools and possibly only while the modular drive head 40 is not attached to the rotating power base 20. For example, the modular drive head may be adjusted only with the use of a separate adjustment tool. Access to such adjustment tool may be limited to, for example, supervisory personnel to prevent unapproved or incorrect adjustments to be made.

According to some example embodiments, the separate adjustment tool may be a spring compression tool that may be used to adjust the discrete torque value. Such a spring compression tool would generally not permit manufacturing line personnel to adjust the discrete torque value while working on the assembly line. To support example embodiments that permit adjustability of the discrete torque value, the torque value indicia 50, as further described below, may be removable and replaceable on the modular drive head 40 with a torque value indicia 50 that is coded to the adjusted discrete torque value.

According to some example embodiments, the modular drive head 40 may be locked to the rotating power base 20 via a locking mechanism 80. In this regard, to prevent manufacturing workers from changing the modular drive heads without approval, the locking mechanism 80 may require a key 88 to unlock and remove the modular drive head 40 from the rotating power base 20. The key 88 may be carried and controlled by a supervisor, thereby limiting or preventing access to the key 88 by manufacturing workers that use the rotating power tool assembly 10. As such, the key 88 may be separated from the rotating power tool assembly 10. The locking mechanism 80 may include a locking coupler 82 on the rotating power base 20 side of the interface 60 and a locking coupler 84 on the modular drive head 40 side of the interface 60. According to some example embodiments, a key receiving hole 84 may be disposed on one of either sides of the interface to allow for mechanical release of the modular drive head 40 from the rotating power base 20 upon engagement (e.g., insertion) of the key 88 into the hole 84. According to some example embodiments, the modular drive head 40 may latch into engagement (e.g., locked engagement) with the rotating power base 20 upon attachment and therefore, the key 88 may be required for removal (or detachment), but not attachment.

According to some example embodiments, the modular drive head 40 may further comprise a torque control sensor 90. The torque control sensor 90 may be operably coupled to the torque control clutch 44 to be able to detect when the torque control clutch 44 performs a torque limiting slip event. For example, the torque control sensor 90 may be coupled in the mechanics of the torque control clutch 44 to detect the torque limiting slip event. Alternatively, the torque control sensor 90 may be operably coupled to the output drive 43, and the torque control sensor 90 may be configured to detect when the output drive 43 is not rotating (e.g., due to occurrence of a torque limiting slip event). The torque control sensor 90 may be configured to send a signal to the control circuitry 28 indicating that the output drive 43 is not turning, for example, due to the occurrence of a torque limiting slip event. Accordingly, the control circuitry 28 may be configured to receive the signal or communication indicating the occurrence of the torque limiting slip event, and, in response to receiving the communication and maintained actuation of the control switch 30, interrupt power delivery to a motor 34 driving the spindle 36 to stop rotational movement of the spindle 36. According to some example embodiments, the control circuitry 28 may be configured to receive a signal from the torque control sensor 90 indicating that the output drive 43 is not rotating and receive a signal from the control switch 30 indicated that the control switch 30 is actuated (e.g., depressed). In this regard, when the output drive 43 is not rotating and the control switch 30 is actuated, it may be assumed that the torque control clutch 44 has performed a torque limiting slip event and therefore power delivery to the motor 34 may be interrupted. Such interruption of power delivery to the motor 34 may continue until the control switch 30 is no longer actuated (e.g., released). Upon a subsequent actuation of the control switch 30, power may be delivered to the motor 34.

The modular drive head 40 may further comprise a torque value indicia 50. According to some example embodiments, the torque value indicia 50 may be an externally visible indicator disposed on the modular drive head 40. The torque value indicia 50 may comprise a visible characteristic that correlates to the discrete torque value for the modular drive head 40. In this regard, the visible characteristic of the torque value indicia 50 may be a color. As such, a modular drive head 40 having a having a torque value indicia 50 that is green would have a different discrete torque value than a modular drive head 40 having a torque value indicia 50 that is red. As such, the color of the torque value indicia 50 may be used as an indicator of the discrete torque value that is being applied by the rotating power tool assembly 10.

According to some example embodiments, other types of visible characteristics may be used. For example, the torque value indicia 50 may be formed of a number of component indicia (e.g., a number of rings). As such, the number of the component indicia may be used as the indicator of the discrete torque value. For example, a modular drive head 40 with four rings may have a different discrete torque value than a modular drive head 40 with two rings.

According to some example embodiments, the torque value indicia 50 may be positioned on the modular drive head 40 at a location that is not concealed by the operator while using the rotating power tool assembly. In this regard, visibility of the torque value indicia 50 provides substantial utility in the context of manufacturing compliance. As such, placement of the torque value indicia 50 on the modular drive head 40 in a highly visible location is helpful. In this regard, for example, users of a pistol-style designed rotating power tool assembly 10 (e.g., as an electric screwdriver or nutrunner) may often hold the assembly at the trigger handle with a first hand, and then place a second hand near the working tip 48 or chuck 46 to control placement of the working tip 48. For this reason, the torque value indicia 50 may be placed rearward (i.e., further away from the working tip 48 and at or near the interface 60) to avoid the torque value indicia 50 being covered by the user's second, guide hand.

Additionally, according to some example embodiments, the torque value indicia 50 may comprise a ring. In this regard, the ring may extend around a circumference of the modular drive head 40. As such, the torque value indicia 50 may be viewable from any side of the rotating power tool assembly 10. Further, the width of the ring may be selected to increase visibility of the torque value indicia 50. In this regard, a width of the ring may be greater than 0.25 inches to increase visibility of the ring from a distance of, for example, 10 feet or more. Further, according to some example embodiments, the torque value indicia 50 may also comprise light reflective features to increase visibility of the visible characteristic of the torque value indicia 50. In this regard, the torque value indicia 50 may include differing reflective features (e.g., surfaces or materials using techniques such as glass bead or micro-prismatic approaches) that permit the torque value indicia 50 to gleam or glimmer a certain color in certain lightings.

Figure 2:
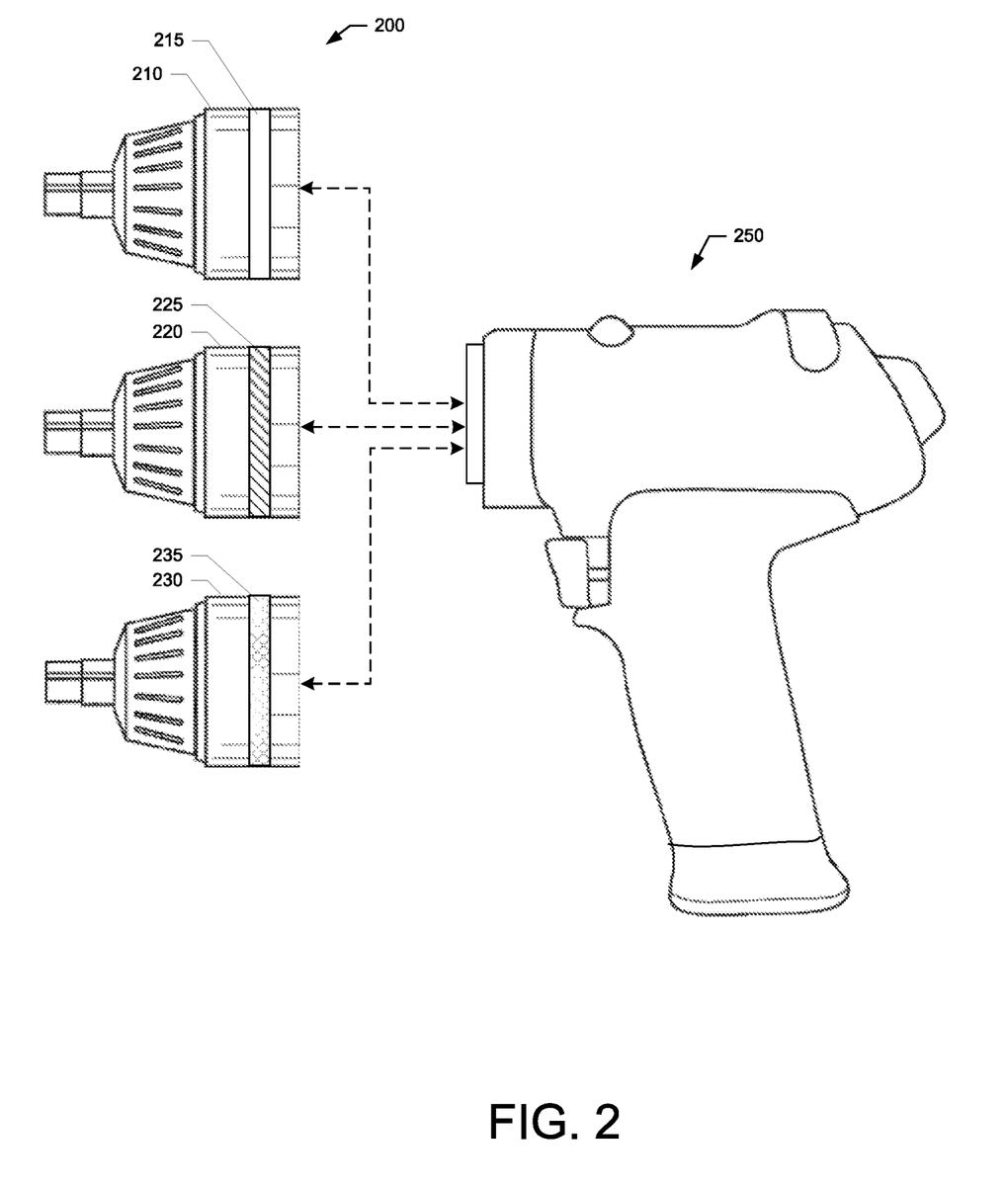
FIG. 2 illustrates an example rotating power tool accessory system in accordance with some example embodiments.

Now referring to FIG. 2, a rotating power tool accessory system 200 is shown. In this regard, the system 200 comprises a plurality of modular drive heads that can be detachably coupled to the rotating power base 250. The system 200 may comprise modular drive heads 210, 220, and 230, each of which may be same or similar to the modular drive head 40 described above. However, each of the modular drive heads 210, 220, and 230 may have a different discrete torque value and therefore would also have a different visual characteristic of the their respective torque value indicias 215, 225, and 235, each of which may be formed in the same or similar manner as described with respect to torque value indicia 50. Further, each modular drive head 210, 220, and 230 may be configured to be detachably coupled to a rotating power base 250, with each modular drive head comprising a respective torque control clutch to limit torque output to a respective discrete torque value.

Figure 3:
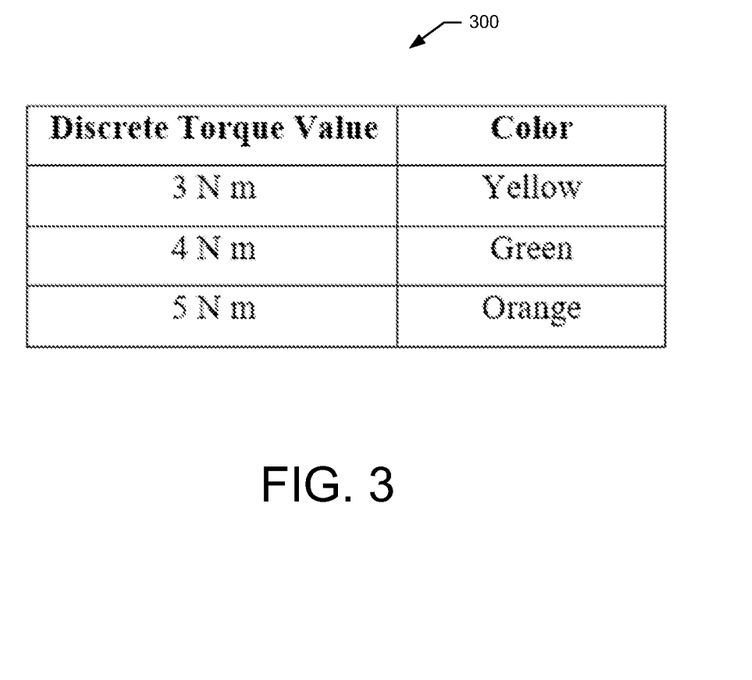
FIG. 3 is a table correlating torque values with colors according to some example embodiments.

In the example embodiments illustrated in FIG. 2, the torque value indicias 215, 225, and 235 are formed as rings that wrap around the circumference of the respective modular drive head 210, 220, and 230 closer to an interface end of the modular drive heads, opposite the working tip. According to some example embodiments, each of the rings may have a width of greater than 0.25 inches. According to some example embodiments, the color and discrete torque value may be defined as provided in the table 300 shown in FIG. 3. In this regard, for example, the modular drive head 210 with a torque value indicia 215 that is yellow, would have a discrete torque value of 3 N m (Newton meters). Further, the modular drive head 220 with a torque value indicia 225 that is green, would have a discrete torque value of 4 N m. Finally, the modular drive head 230 with a torque value indicia 235 that is orange, would have a discrete torque value of 5 N m.

Figure 4:
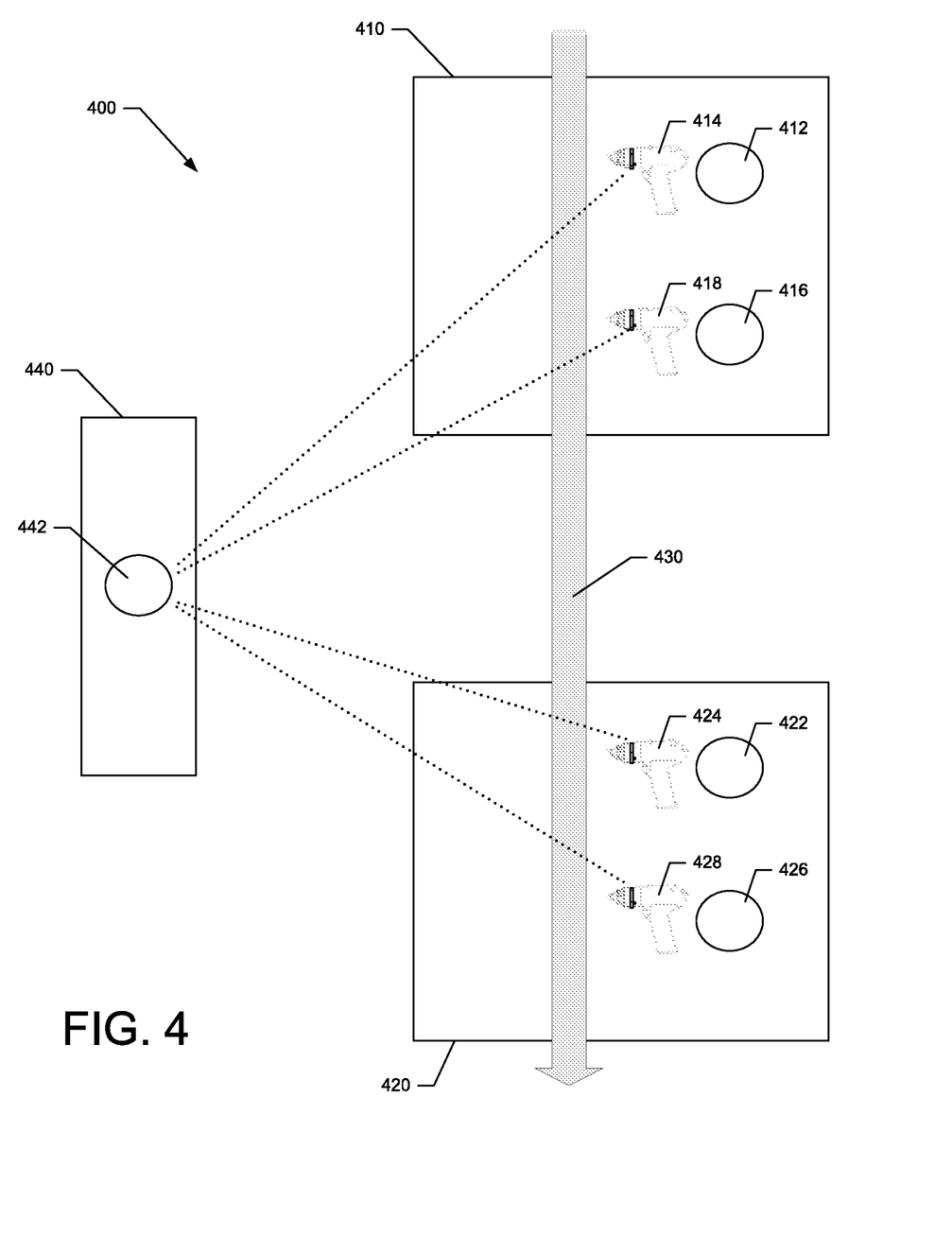
FIG. 4 shows an example manufacturing environment according to some example embodiments.

Now referring to FIG. 4, an example manufacturing environment 400 is shown. In this regard, the manufacturing environment 400 may include an assembly line 430 that passes through a manufacturing task zone 410 and a manufacturing task zone 420. A specific first manufacturing task (e.g., fastener application) may be performed in manufacturing task zone 410 that requires a certain torque. Manufacturing worker 412 is utilizing rotating power tool assembly 414 to perform a first manufacturing task in manufacturing task zone 410, and manufacturing worker 416 is utilizing rotating power tool assembly 418 to perform the first manufacturing task. Similarly, a specific second manufacturing task (e.g., fastener application) may be performed in manufacturing task zone 420 that requires a certain torque (e.g., that may be different from the first manufacturing task). Manufacturing worker 422 is utilizing rotating power tool assembly 424 to perform the second manufacturing task in manufacturing task zone 420, and manufacturing worker 426 is utilizing rotating power tool assembly 428 to perform the second manufacturing task.

A supervisor 442 is also present within the manufacturing environment 400. In this regard, according to some example embodiments, the supervisor 442 may remain in the supervisor zone 440. The supervisor zone 440 may be some distance from the manufacturing task zones 410 and 420. For example, the supervisor zone 440 may be more than 10 feet from the task zones 410 and 420, and may be up to 50 feet from the task zones 410 and 420.

However, according to various example embodiments, because of the visibility considerations of the torque value indicia on the modular drive heads of the rotating power tool assemblies, a supervisor 442 that is some distance away, may still be able to verify that correct torques are being applied for the first manufacturing task and the second manufacturing task. The supervisor 442 may need to simply look at the torque value indicia of the rotating power tool assemblies, as indicated by the dotted lines of sight of the supervisor 442. As such, the supervisor 442 may be able to visually verify that rotating power tool assemblies operating on the first manufacturing task have a first torque value indicia with a first visual characteristic in compliance with a manufacturing procedure. The supervisor 442 may also be able to visually verify that rotating power tool assemblies operating on a second manufacturing task have a second torque value indicia with a second visual characteristic. According to some example embodiments, the first manufacturing task may comprise tightening first fasteners on a product moving along the assembly line 430, and the second manufacturing task comprises tightening second fasteners on the product moving along the assembly line 430.

Figure 5:
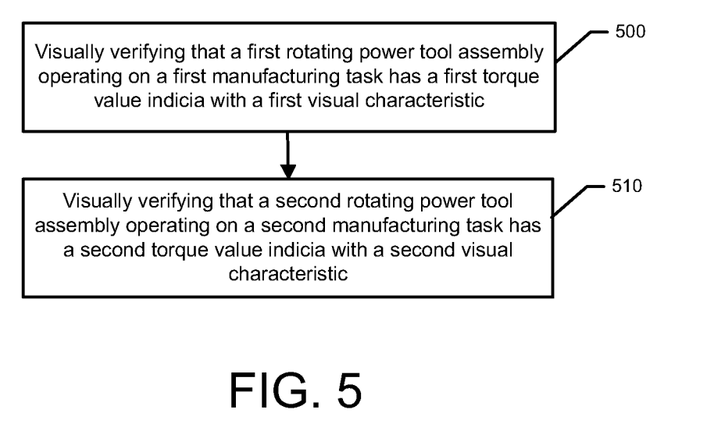
FIG. 5 illustrates a flow chart of a method for manufacturing compliance according to some example embodiments.

Now referring to FIG. 5, an example method is provided for manufacturing compliance leveraging example embodiments described herein. In this regard, at 500, the example method may comprise visually verifying that a first rotating power tool assembly operating on a first manufacturing task has a first torque value indicia with a first visual characteristic (e.g., a certain color). The first visual characteristic may indicate that a first rotating power base of the first rotating power tool assembly is attached to a first modular drive head. The first modular drive head may have a first non-adjustable torque control clutch that operates to limit applied torque to a first discrete torque value. The first discrete torque value may be correlated to the first visual characteristic, and the first discrete torque value may be selected for the first manufacturing task (e.g., based on the type of fasteners and materials being fastened). The first modular drive head may also be detachably coupled to the first rotating power base.

At 510, the example method may comprise visually verifying that a second rotating power tool assembly operating on a second manufacturing task has a second torque value indicia with a second visual characteristic. In this regard, the second visual characteristic may indicate that a second rotating power base of the second rotating power tool assembly is attached to a second modular drive head. The second modular drive head may have a second non-adjustable torque control clutch that limits applied torque to a second discrete torque value. The second discrete torque value may be correlated to the second visual characteristic, and the second discrete torque value may be selected for the second manufacturing task. The second modular drive head may also be detachably coupled to the second rotating power base.

Additionally, with respect to the example method, the second discrete torque value may be different from the first discrete torque value and the second visible characteristic may be visibly different from the first visible characteristic. Additionally, according to some example embodiments, the example method may further comprise locking the first modular drive head on the first rotating power base such that user personnel cannot detach the first modular drive head from the first rotating power base (e.g., without the assistance of the supervisor that has the key). Additionally, according to some example embodiments, the example method may further comprise locking the second modular drive head on the second rotating power base such that user personnel cannot detach the second modular drive head from the second rotating power base (e.g., without the assistance of the supervisor that has the key). Additionally or alternatively, the first manufacturing task may comprise tightening first fasteners on a product moving along an assembly line, and the second manufacturing task comprises tightening second fasteners on the product moving along the assembly line. In light the above description, various example embodiments have been described.

Additional example embodiments are provided with reference to further combinations of the elements, features, and concepts described herein. As such, a first embodiment may comprise a rotating power tool assembly. The rotating power tool assembly may comprise a rotating power base configured to rotate a spindle in response to actuation of a control switch, and a modular drive head configured to be detachably coupled to the rotating power base. The modular drive head may comprise a torque control clutch, a working tip, and a torque value indicia. The torque control clutch may comprise an input drive that is configured to be detachably coupled to the spindle and an output drive operably coupled to the working tip. The input drive may be operably coupled to the output drive to selectably rotate the output drive in response to rotation of the input drive. The torque control clutch may be non-adjustably structured to implement a torque limiting slip event that prevents the output drive from further rotation, despite continued rotation of the input drive, in response to the output drive being subjected to torque in excess of a discrete torque value. The torque value indicia may be externally visible and the torque value indicia may comprise a visible characteristic that correlates to the discrete torque value.

The example rotating power tool assembly described above may be modified, augmented, or may include optional additions, some of which are described herein. The modifications, augmentations or optional additions listed below are some examples of elements that may be added in any desirable combination. Within this context, other embodiments may be defined by each respective combination of modifications, augmentations or optional additions based on the first embodiment. For example, in a second embodiment the visible characteristic of the torque value indicia is a color. The second embodiment may be combined with the first embodiment, as appropriate. Additionally or alternatively, in a third embodiment the torque value indicia is positioned on the modular drive head at a location that is not concealed by the operator while using the rotating power tool assembly. The third embodiment may be combined with any or all of first and second embodiments, as appropriate. Additionally or alternatively, in a fourth embodiment the torque value indicia comprises a ring that extends around a circumference of the modular drive head to be viewable from any side. The fourth embodiment may be combined with any or all of first to third embodiments, as appropriate. Modifying the fourth embodiment, in a fifth embodiment a width of the ring is greater than 0.25 inches to increase visibility of the ring from a distance (e.g., 10 feet). In some instances, according to the fifth embodiment, the torque value indicia may comprise light reflective features to increase visibility of the visible characteristic of the torque value indicia. The fifth embodiment, and the variations of the fifth embodiment, may be combined with any or all of the first to fourth embodiments, as appropriate. Additionally or alternatively, in a sixth embodiment, the modular drive head further comprises speed reduction gearing configured to reduce a rotational speed of the working tip relative to the spindle. The sixth embodiment may be combined with any or all of first to fifth embodiments, as appropriate. Additionally or alternatively, in a seventh embodiment, the rotating power tool assembly further comprises a locking mechanism configured to lock the modular drive head to the rotating power base. A separate key may be required to unlock the modular drive head from the rotating power base. The seventh embodiment may be combined with any or all of the first to sixth embodiments, as appropriate. Additionally or alternatively, in an eight embodiment, the rotating power base further comprises a control circuitry. The modular drive head further comprises a torque control sensor configured to detect an occurrence of the torque limiting slip event and provide a communication indicating the occurrence of the torque limiting slip event to the control circuitry. The control circuitry is configured to receive the communication indicating the occurrence of the torque limiting slip event, and in response to receiving the communication and maintained actuation of the control switch, interrupt power delivery to a motor driving the spindle to stop rotational movement of the spindle. The eighth embodiment may be combined with any or all of the first to seventh embodiments, as appropriate.

Additionally or alternatively, in a ninth embodiment, the rotating power tool assembly further comprises a second modular drive head configured to be detachably coupled to the rotating power base. The second modular drive head comprises a second torque control clutch, a second working tip, and a second torque value indicia The second torque control clutch comprises a second input drive that is configured to be detachably coupled to the spindle and a second output drive operably coupled to the second working tip. The second input drive is operably coupled to the second output drive to selectably rotate the second output drive in response to rotation of the second input drive. The second torque control clutch is permanently and non-adjustably structured to implement a second torque limiting slip event that prevents the second output drive from further rotation, despite continued rotation of the second input drive, in response to the second output drive being subjected to a second discrete torque value. The second torque value indicia is externally visible and the second torque value indicia comprises a second visible characteristic that correlates to the second discrete torque value. The second discrete torque value is different from the discrete toque value and the second visible characteristic is visibly different from the visible characteristic. The ninth embodiment may be combined with any or all of the first to eighth embodiments, as appropriate.

A tenth example embodiment is a rotating power tool accessory system comprising a first modular drive head configured to be detachably coupled to a rotating power base and a second modular drive head configured to be detachably coupled to the rotating power base. The first modular drive head comprises a first torque control clutch and a first torque value indicia, and the second modular drive head comprises a second torque control clutch and a second torque value indicia. The first torque control clutch is configured to prevent rotation of a first working tip of the first modular drive head in response to the first working tip being subjected to a first discrete torque value. The first torque value indicia comprises a first visible characteristic that correlates to the first discrete torque value. The second torque control clutch is configured to prevent rotation of a second working tip of the second modular drive head in response to the second working tip being subjected to a second discrete torque value. The second torque value indicia comprises a second visible characteristic that correlates to the second discrete torque value. The second discrete torque value is different from the first discrete toque value and the second visible characteristic is visibly different from the first visible characteristic.

The example rotating power tool accessory system described above may be modified, augmented, or may include optional additions, some of which are described herein. The modifications, augmentations or optional additions listed below are some examples of elements that may be added in any desirable combination. Within this context, other embodiments may be defined by each respective combination of modifications, augmentations or optional additions based on the tenth embodiment. For example, in an eleventh embodiment the first visible characteristic of the first torque value indicia is a first color and the second visible characteristic of the second torque value indicia is a second color. The eleventh embodiment may be combined with the tenth embodiment, as appropriate. Additionally or alternatively, in a twelfth the first torque value indicia is positioned on the first modular drive head at a location that is not concealed by the operator while using a rotating power tool assembly form by attachment of the first modular drive head on the rotating power base. The twelfth embodiment may be combined with any or all of the tenth or eleventh embodiments, as appropriate. In a thirteenth embodiment, the first torque value indicia comprises a ring that extends around a circumference of the first modular drive head to be viewable from any side. The thirteenth embodiment may be combined with any or all of the tenth to twelfth embodiments, as appropriate. In a fourteenth embodiment a width of the ring is greater than 0.25 inches to increase visibility of the ring from a distance. The fourteenth embodiment may be combined with any or all of the tenth to thirteenth embodiments, as appropriate. In a fifteenth embodiment the first modular drive head further comprises a locking mechanism configured to lock the first modular drive head to the rotating power base. A separate key is required to unlock the first modular drive head from the rotating power base. The fifteenth embodiment may be combined with any or all of the tenth to fourteenth embodiments, as appropriate. In a sixteenth embodiment, the first torque value indicia comprises light reflective features to increase visibility of the first visible characteristic of the first torque value indicia. The sixteenth embodiment may be combined with any or all of the tenth to fifteenth embodiments, as appropriate. In a seventeenth embodiment, the first discrete torque value for the first modular drive head is only adjustable to a third discrete torque value via application of a separate adjustment tool to the first modular drive head, and the first torque value indicia is removable from the first modular drive head and replaceable with a third torque value indicia that comprises a third visible characteristic that correlates to the third discrete torque value. The seventeenth embodiment may be combined with any or all of the tenth to sixteenth embodiments, as appropriate.

An eighteenth embodiment is a method for manufacturing compliance comprising visually verifying that a first rotating power tool assembly operating on a first manufacturing task has a first torque value indicia with a first visual characteristic and visually verifying that a second rotating power tool assembly operating on a second manufacturing task has a second torque value indicia with a second visual characteristic. The first visual characteristic indicates that a first rotating power base of the first rotating power tool assembly is attached to a first modular drive head having a first non-adjustable torque control clutch that limits applied torque to a first discrete torque value correlated to the first visual characteristic and selected for the first manufacturing task. The first modular drive head is detachably coupled to the first rotating power base. The second visual characteristic indicates that a second rotating power base of the second rotating power tool assembly is attached to a second modular drive head having a second non-adjustable torque control clutch that limits applied torque to a second discrete torque value correlated to the second visual characteristic and selected for the second manufacturing task, the second modular drive head being detachably coupled to the second rotating power base. The second discrete torque value is different from the first discrete torque value and the second visible characteristic is visibly different from the first visible characteristic.

The example method described above may be modified, augmented, or may include optional additions, some of which are described herein. The modifications, augmentations or optional additions listed below are some examples of elements that may be added in any desirable combination. Within this context, other embodiments may be defined by each respective combination of modifications, augmentations or optional additions based on the eighteenth embodiment. For example, in a nineteenth embodiment the method further comprises locking the first modular drive head on the first rotating power base such that user personnel cannot detach the first modular drive head from the first rotating power base. The nineteenth embodiment may be combined with the eighteenth embodiment, as appropriate. In a twentieth embodiment, the first manufacturing task comprises tightening first fasteners on a product moving along an assembly line, and the second manufacturing task comprises tightening second fasteners on the product moving along the assembly line.

Many modifications to the example embodiment provided herein, as well as other example embodiments, will come to mind to one skilled in the art to which these example embodiments pertain having the benefit of the teachings presented in the foregoing descriptions and the associated drawings. Therefore, it is to be understood that the example embodiments are not to be limited to the specific ones disclosed and that modifications and other embodiments are intended to be included within the scope. Moreover, although the foregoing descriptions and the associated drawings describe example embodiments in the context of certain example combinations of elements or functions, it should be appreciated that different combinations of elements or functions may be provided by alternative embodiments without departing from the scope. In this regard, for example, different combinations of elements or functions than those explicitly described above are also contemplated. In cases where advantages, benefits or solutions to problems are described herein, it should be appreciated that such advantages, benefits or solutions may be applicable to some example embodiments, but not necessarily all example embodiments. Thus, any advantages, benefits or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A rotating power tool assembly comprising:
   a rotating power base configured to rotate a spindle in response to actuation of a control switch; and
   a modular drive head configured to be detachably coupled to the rotating power base, the modular drive head comprising a torque control clutch, a working tip, and a torque value indicia;
   wherein the torque control clutch comprises an input drive that is configured to be detachably coupled to the spindle and an output drive operably coupled to the working tip, wherein the input drive is operably coupled to the output drive to selectably rotate the output drive in response to rotation of the input drive;
   wherein the torque control clutch is non-adjustably structured to implement a torque limiting slip event that prevents the output drive from further rotation, despite continued rotation of the input drive, in response to the output drive being subjected to torque in excess of a discrete torque value;

wherein the torque value indicia is externally visible and the torque value indicia comprises a visible characteristic that correlates to the discrete torque value;

wherein the modular drive head further comprises a locking mechanism configured to lock the modular drive head to the rotating power base, without use of a separate key, to prevent removal of the modular drive head from the rotating power base by an unauthorized user, wherein the separate key is required to unlock the modular drive head from the rotating power base to permit removal of the modular drive head from the rotating power base after being unlocked by an authorized user in possession of the separate key.

2. The rotating power tool assembly of claim 1, wherein the visible characteristic of the torque value indicia is a color.

3. The rotating power tool assembly of claim 2, wherein the torque value indicia comprises differing light reflective features configured to cause the torque value indicia to visibly gleam or glimmer by reflecting light that is the color of the torque value indicia.

4. The rotating power tool assembly of claim 1, wherein the torque value indicia comprises a ring that extends around a circumference of the modular drive head to be viewable from any side.

5. The rotating power tool assembly of claim 4, wherein a width of the ring is greater than 0.25 inches to increase visibility of the ring from a distance and comprises light reflective features to increase visibility of the visible characteristic of the torque value indicia.

6. The rotating power tool assembly of claim 1, wherein the modular drive head further comprises speed reduction gearing configured to reduce a rotational speed of the working tip relative to the spindle.

7. A rotating power tool assembly comprising:
a rotating power base configured to rotate a spindle in response to actuation of a control switch; and
a modular drive head configured to be detachably coupled to the rotating power base, the modular drive head comprising a torque control clutch, a working tip, and a torque value indicia;
wherein the torque control clutch comprises an input drive that is configured to be detachably coupled to the spindle and an output drive operably coupled to the working tip, wherein the input drive is operably coupled to the output drive to selectably rotate the output drive in response to rotation of the input drive;
wherein the torque control clutch is non-adjustably structured to implement a torque limiting slip event that prevents the output drive from further rotation, despite continued rotation of the input drive, in response to the output drive being subjected to torque in excess of a discrete torque value;
wherein the torque value indicia is externally visible and the torque value indicia comprises a visible characteristic that correlates to the discrete torque value;
wherein the rotating power base further comprises a control circuitry;
wherein the modular drive head further comprises a torque control sensor configured to detect an occurrence of the torque limiting slip event and provide a communication indicating the occurrence of the torque limiting slip event to the control circuitry;
wherein the control circuitry is configured to:
receive the communication indicating the occurrence of the torque limiting slip event; and
in response to receiving the communication and maintained actuation of the control switch, interrupt power delivery to a motor driving the spindle to stop rotational movement of the spindle.

8. The rotating power tool assembly of claim 1 further comprising a second modular drive head configured to be detachably coupled to the rotating power base, the second modular drive head comprising a second torque control clutch, a second working tip, and a second torque value indicia;
wherein the second torque control clutch comprises a second input drive that is configured to be detachably coupled to the spindle and a second output drive operably coupled to the second working tip, wherein the second input drive is operably coupled to the second output drive to selectably rotate the second output drive in response to rotation of the second input drive;
wherein the second torque control clutch is permanently and non-adjustably structured to implement a second torque limiting slip event that prevents the second output drive from further rotation, despite continued rotation of the second input drive, in response to the second output drive being subjected to a second discrete torque value;
wherein the second torque value indicia is externally visible and the second torque value indicia comprises a second visible characteristic that correlates to the second discrete torque value;
wherein the second discrete torque value is different from the discrete toque value and the second visible characteristic is visibly different from the visible characteristic.

9. A rotating power tool accessory system comprising:
a first modular drive head configured to be detachably coupled to a rotating power base, the first modular drive head comprising a first torque control clutch, a first torque value indicia, and a locking mechanism; and
a second modular drive head configured to be detachably coupled to the rotating power base, the second modular drive head comprising a second torque control clutch and a second torque value indicia;
wherein the first torque control clutch is configured to prevent rotation of a first working tip of the first modular drive head in response to the first working tip being subjected to a first discrete torque value, the first torque value indicia comprising a first visible characteristic that correlates to the first discrete torque value;
wherein the second torque control clutch is configured to prevent rotation of a second working tip of the second modular drive head in response to the second working tip being subjected to a second discrete torque value, the second torque value indicia comprising a second visible characteristic that correlates to the second discrete torque value;
wherein the second discrete torque value is different from the first discrete toque value and the second visible characteristic is visibly different from the first visible characteristic;
wherein the locking mechanism is configured to lock the first modular drive head to the rotating power base, without use of a separate key, to prevent removal of the first modular drive head from the rotating power base by an unauthorized user, wherein the separate key is required to unlock the modular drive head from the rotating power base to permit removal of the modular drive head from the rotating power base after being unlocked by an authorized user in possession of the separate key.

10. The rotating power tool accessory system of claim 9, wherein the first visible characteristic of the first torque value indicia is a first color and the second visible characteristic of the second torque value indicia is a second color.

11. The rotating power tool accessory system of claim 9, wherein the first torque value indicia is positioned on the first modular drive head at a location that is not concealed by the operator while using a rotating power tool assembly form by attachment of the first modular drive head on the rotating power base.

12. The rotating power tool accessory system of claim 9, wherein the first torque value indicia comprises a ring that extends around a circumference of the first modular drive head to be viewable from any side.

13. The rotating power tool accessory system of claim 12, wherein a width of the ring is greater than 0.25 inches to increase visibility of the ring from a distance.

14. The rotating power tool accessory system of claim 9, wherein the first torque value indicia comprises light reflective features to increase visibility of the first visible characteristic of the first torque value indicia.

15. The rotating power tool accessory system of claim 9, wherein the first discrete torque value for the first modular drive head is only adjustable to a third discrete torque value via application of a separate adjustment tool to the first modular drive head; and
   wherein the first torque value indicia is removable from the first modular drive head and replaceable with a third torque value indicia that comprises a third visible characteristic that correlates to the third discrete torque value.

16. A method for manufacturing compliance comprising:
   visually verifying that a first rotating power tool assembly operating on a first manufacturing task has a first torque value indicia with a first visual characteristic, the first visual characteristic indicating that a first rotating power base of the first rotating power tool assembly is attached to a first modular drive head having a first non-adjustable torque control clutch that limits applied torque to a first discrete torque value correlated to the first visual characteristic and selected for the first manufacturing task, the first modular drive head being detachably coupled to the first rotating power base;
   visually verifying that a second rotating power tool assembly operating on a second manufacturing task has a second torque value indicia with a second visual characteristic, the second visual characteristic indicating that a second rotating power base of the second rotating power tool assembly is attached to a second modular drive head having a second non-adjustable torque control clutch that limits applied torque to a second discrete torque value correlated to the second visual characteristic and selected for the second manufacturing task, the second modular drive head being detachably coupled to the second rotating power base; and
   unlocking a locking mechanism of the first modular drive head using a separate key, by an authorized user in possession of the separate key, to permit subsequent removal of the modular drive head from the first rotating power base, wherein the locking mechanism is configured to lock the first modular drive head to the first rotating power base, without use of the separate key, to prevent removal of the first modular drive head from the first rotating power base by an unauthorized user;
   wherein the second discrete torque value is different from the first discrete torque value and the second visible characteristic is visibly different from the first visible characteristic.

17. The method of claim 16 further comprising locking the first modular drive head on the first rotating power base such that the unauthorized user cannot detach the first modular drive head from the first rotating power base.

18. The method of claim 17 wherein the first manufacturing task comprises tightening first fasteners on a product moving along an assembly line; and
   wherein the second manufacturing task comprises tightening second fasteners on the product moving along the assembly line.

19. The rotating power tool assembly of claim 1, wherein the modular drive head further comprises a chuck configured to secure the working tip to the torque control clutch.

\* \* \* \* \*